United States Patent
Gu et al.

(10) Patent No.: US 11,250,368 B1
(45) Date of Patent: Feb. 15, 2022

(54) BUSINESS PREDICTION METHOD AND APPARATUS

(71) Applicant: Shanghai IceKredit, Inc., Shanghai (CN)

(72) Inventors: Lingyun Gu, Shanghai (CN); Minqi Xie, Shanghai (CN); Wan Duan, Shanghai (CN); Zhenyu Wang, Shanghai (CN); Yang Zhang, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/401,349

(22) Filed: Aug. 13, 2021

(30) Foreign Application Priority Data

Nov. 30, 2020 (CN) .......................... 202011366789.4

(51) Int. Cl.
*G06N 20/00* (2019.01)
*G06Q 10/06* (2012.01)
*G06Q 10/04* (2012.01)

(52) U.S. Cl.
CPC ....... *G06Q 10/06375* (2013.01); *G06N 20/00* (2019.01); *G06Q 10/04* (2013.01); *G06Q 10/067* (2013.01)

(58) Field of Classification Search
CPC ...... G06N 20/00; G06Q 10/04; G06Q 10/067; G06Q 10/06375
See application file for complete search history.

(56) References Cited

U.S. PATENT DOCUMENTS

| | | | |
|---|---|---|---|
| 11,100,524 B1* | 8/2021 | Ross | G06Q 30/02 |
| 2005/0055257 A1* | 3/2005 | Senturk | G06Q 30/0201 |
| | | | 705/7.11 |

(Continued)

FOREIGN PATENT DOCUMENTS

| | | |
|---|---|---|
| CN | 110648215 A | 1/2020 |
| CN | 111523678 A | 8/2020 |
| CN | 111882140 A | 11/2020 |

OTHER PUBLICATIONS

Torrent, "PSD2 Explainable AI Model for Credit Scoring", Nov. 20, 2020. (Year: 2020).*

(Continued)

*Primary Examiner* — Dave Misir
(74) *Attorney, Agent, or Firm* — Bayramoglu Law Offices LLC

(57) ABSTRACT

A business prediction method includes: obtaining a first business sample set and a second business sample set; performing training based on the first business sample set and the second business sample set to obtain a business prediction model, and predicting received to-be-predicted business information based on the business prediction model to obtain a business prediction result corresponding to the received to-be-predicted business information. A business prediction apparatus is further provided. The business prediction method and the business prediction apparatus take into account data features of some business samples of being rejected in a business validation, while considering business samples of passing the business validation. This restores a business scenario, reduces the waste of costs of the rejected samples, and balances demands for a modeling sample and a rejected sample reasonably when there are insufficient samples of passing the business validation.

3 Claims, 2 Drawing Sheets

(56) References Cited

U.S. PATENT DOCUMENTS

| | | | | |
|---|---|---|---|---|
| 2005/0192824 A1* | 9/2005 | Schuetze | ................ | G06N 20/00 |
| | | | | 706/20 |
| 2014/0046879 A1* | 2/2014 | Maclennan | .......... | G06Q 10/067 |
| | | | | 706/12 |
| 2018/0060744 A1* | 3/2018 | Achin | ...................... | G06N 5/02 |
| 2021/0287111 A1* | 9/2021 | Zhou | .................. | G06Q 30/0203 |

OTHER PUBLICATIONS

Provenzano, "Machine Learning approach for Credit Scoring", Jul. 20, 2020. (Year: 2020).*

* cited by examiner

BUSINESS PREDICTION METHOD AND APPARATUS

CROSS REFERENCE TO THE RELATED APPLICATIONS

This application is based upon and claims priority to Chinese Patent Application No. 202011366789.4, filed on Nov. 30, 2020, the entire contents of which are incorporated herein by reference.

TECHNICAL FIELD

The present invention relates to the technical field of machine learning, and more particularly, to a business prediction method and apparatus.

BACKGROUND

Generally, a business prediction model based on machine learning can be used to evaluate a business indicator of a classification label of the business. In conventional design, for actual sample training, only business samples of passing a business validation are usually selected, and then behaviors of these business samples of passing the business validation are predicted in a subsequent business use process. Meanwhile, business samples of being rejected by a rule or a business prediction model are usually excluded. In this way, a business prediction model obtained through training can neither obtain future behaviors of rejected business objects during subsequent business prediction, nor determine various business indicators of the rejected business objects. This results in a parameter estimation deviation of a final business prediction model and a waste of subsequent labor costs.

SUMMARY

Based on disadvantages of the existing design, the present invention provides a business prediction method and apparatus, which take into account data features of some business samples of being rejected in a business validation, while considering business samples of passing the business validation. Therefore, a business prediction model obtained through training in this way can predict a future behavior of a rejected business object, thereby reducing a parameter estimation deviation and a waste of costs.

According to a first aspect of the present invention, a business prediction method is provided, applied to a computer device, where the method includes:

obtaining a first business sample set and a second business sample set, where the first business sample set includes a training sample set, a test sample set and a validation sample set, the second business sample set includes a rejected sample set, the first business sample set is used to represent a business sample of passing a business validation, and the second business sample set is used to represent a business sample of being rejected in the business validation; and performing training based on the first business sample set and the second business sample set to obtain a business prediction model, and predicting received to-be-predicted business information based on the business prediction model to obtain a business prediction result corresponding to the to-be-predicted business information.

In a possible implementation of the first aspect, the step of performing training based on the first business sample set and the second business sample set to obtain the business prediction model includes:

establishing a first logistic regression model and a first machine learning model based on the training sample set;

performing iterative sample analysis on the first business sample set and the second business sample set based on the first machine learning model, and performing screening on the rejected sample set based on a sample analysis result to obtain a target rejected sample set;

establishing a second logistic regression model based on the target rejected sample set and the training sample set, and analyzing the test sample set and the validation sample set respectively based on the first logistic regression model and the second logistic regression model to obtain a first evaluation indicator of the first logistic regression model and a second evaluation indicator of the second logistic regression model; and determining a final business prediction model based on the first evaluation indicator and the second evaluation indicator.

In a possible implementation of the first aspect, the step of performing iterative sample analysis on the first business sample set and the second business sample set based on the first machine learning model, and performing screening on the rejected sample set based on the sample analysis result to obtain the target rejected sample set includes:

analyzing the test sample set based on the first machine learning model, and establishing initial area under curve (AUC) and an initial Kolmogorov-Smirnov (KS) value;

analyzing the rejected sample set based on the first machine learning model, and sorting rejected samples in the rejected sample set based on a probability score obtained from analyzing to obtain a sorted rejected sample set;

selecting, from the sorted rejected sample set, rejected sample sets in different preset rule ranges, and establishing a corresponding second machine learning model based on the training sample set and a rejected sample set in each preset rule range; and performing screening on the rejected sample set based on each corresponding second machine learning model to obtain the target rejected sample set.

In a possible implementation of the first aspect, the step of selecting, from the sorted rejected sample set, the rejected sample sets in the different preset rule ranges, and establishing the corresponding second machine learning model based on the training sample set and the rejected sample set in the each preset rule range includes:

selecting, from the sorted rejected sample set, first N rejected samples as a first rejected sample set, and establishing a corresponding second machine learning model based on the training sample set and the first rejected sample set;

selecting, from the sorted rejected sample set, last M rejected samples as a second rejected sample set, and establishing a corresponding second machine learning model based on the training sample set and the second rejected sample set; and using the first N rejected samples and the last M rejected samples as a third rejected sample set, and establishing a corresponding second machine learning model based on the training sample set and the third rejected sample set.

In a possible implementation of the first aspect, the step of performing screening on the rejected sample set based on the each corresponding second machine learning model to obtain the target rejected sample set includes:

predicting the test sample set based on the each corresponding second machine learning model, and generating candidate AUC and a candidate KS value of a prediction result of the each second machine learning model;

selecting, from all candidate AUC, maximum candidate AUC as target AUC, and selecting, from all candidate KS values, a maximum KS value as a target KS value;

determining whether a currently configured evaluation indicator is AUC or a KS value, and when the currently configured evaluation indicator is the AUC, determining whether a sum of the target AUC and a preset tolerance index is greater than the initial AUC;

when the sum of the target AUC and the preset tolerance index is greater than the initial AUC, using a rejected sample set in a preset rule range corresponding to the target AUC to be a screened rejected sample set, and setting the initial AUC to the target AUC; selecting a second machine learning model corresponding to the target AUC to be a new first machine learning model; after deleting the screened rejected sample set from the sorted rejected sample set, performing the step of analyzing the test sample set based on the first machine learning model and establishing the initial AUC and the initial KS value; when the sum of the target AUC and the preset tolerance index is not greater than the initial AUC, determining all screened rejected sample sets as the target rejected sample set; and when the sum of the target AUC and the preset tolerance index is not greater than the initial AUC, determining the rejected sample set in the preset rule range corresponding to the target AUC to be the target rejected sample set; or when the currently configured evaluation indicator is the KS value, determining whether a sum of the target KS value and a preset tolerance index is greater than the initial KS value;

when the sum of the target KS value and the preset tolerance index is greater than the initial KS value, using a rejected sample set in a preset rule range corresponding to the target KS value to be a screened rejected sample set, and setting the initial KS value to the target KS value; selecting a second machine learning model corresponding to the target KS value to be a new first machine learning model; after deleting the screened rejected sample set from the sorted rejected sample set, performing the step of analyzing the test sample set based on the first machine learning model and establishing the initial AUC and the initial KS value; when the sum of the target KS value and the preset tolerance index is not greater than the initial KS value, determining all screened rejected sample sets as the target rejected sample set; and when the sum of the target KS value and the preset tolerance index is not greater than the initial KS value, determining the rejected sample set in the preset rule range corresponding to the target KS value to be the target rejected sample set.

In a possible implementation of the first aspect, the step of analyzing the test sample set and the validation sample set respectively based on the first logistic regression model and the second logistic regression model to obtain the first evaluation indicator of the first logistic regression model and the second evaluation indicator of the second logistic regression model includes:

respectively performing probability prediction on the test sample set and the validation sample set based on the first logistic regression model to obtain a first probability prediction result of the test sample set and the validation sample set, and respectively performing probability prediction on the test sample set and the validation sample set based on the second logistic regression model to obtain a second probability prediction result of the test sample set and the validation sample set; and respectively calculating first AUC and a first KS value of the first probability prediction result, and second AUC and a second KS value of the second probability prediction result, determining the first AUC and the first KS value as the first evaluation indicator of the first logistic regression model, and determining the second AUC and the second KS value as the second evaluation indicator of the second logistic regression model.

In a possible implementation of the first aspect, the step of determining the final business prediction model based on the first evaluation indicator and the second evaluation indicator includes:

obtaining a first increase amplitude of the second AUC relative to the first AUC, and a second increase amplitude of the second KS value relative to the first KS value;

if the first increase amplitude is greater than a predetermined amplitude and/or the second increase amplitude is greater than the predetermined amplitude, determining the second logistic regression model as the final business prediction model; and if the first increase amplitude is not greater than the predetermined amplitude and the second increase amplitude is not greater than the predetermined amplitude, determining the first logistic regression model as the final business prediction model.

According to a second aspect of the present invention, a business prediction apparatus is provided, applied to a computer device, where the apparatus includes:

an acquisition module, configured to obtain a first business sample set and a second business sample set, where the first business sample set includes a training sample set, a test sample set and a validation sample set, the second business sample set includes a rejected sample set, the first business sample set is used to represent a business sample of passing a business validation, and the second business sample set is used to represent a business sample of being rejected in the business validation; and a training module, configured to perform training based on the first business sample set and the second business sample set to obtain a business prediction model, and predict received to-be-predicted business information based on the business prediction model to obtain a business prediction result corresponding to the to-be-predicted business information.

Based on any one of the above aspects, the present invention takes into account data features of some business samples of being rejected in a business validation, while considering business samples of passing the business validation. This restores a business scenario really, reduces a waste of costs of the rejected samples, and balances demands for a modeling sample and a rejected sample reasonably when there are insufficient samples of passing the business validation. Therefore, the business prediction model obtained through training in this way can predict a future behavior of a rejected business object when predicting the received to-be-predicted business information, thereby reducing a parameter estimation deviation.

BRIEF DESCRIPTION OF THE DRAWINGS

To describe the technical solutions in the embodiments of the present invention more clearly, the accompanying drawings required for describing the embodiments are briefly described below. It should be understood that, the following accompanying drawings show merely some embodiments of the present invention, and therefore should not be regarded as a limitation to the scope. A person of ordinary skill in the art may still derive other related drawings from these accompanying drawings without creative efforts.

DETAILED DESCRIPTION OF THE EMBODIMENTS

To make the objectives, technical solutions, and advantages of embodiments of the present invention clearer, the technical solutions in the embodiments of the present invention are clearly and completely described below with reference to the accompanying drawings in the embodiments of the present invention. It should be understood that the accompanying drawings in the present invention are only used for description, and are not intended to limit the protection scope of the present invention. In addition, it should be understood that the schematic accompanying drawings are not drawn based on a scale of a real object. The flowchart used in the present invention illustrates operations implemented based on some embodiments of the present invention. It should be understood that the operations in the flowchart may be performed out of sequence, and the steps without a logical context relationship may be performed in a reverse sequence or at the same time. In addition, those skilled in the art may add one or more other operations to the flowchart or remove one or more operations from the flowchart based on the content of the present invention.

Figure 1:
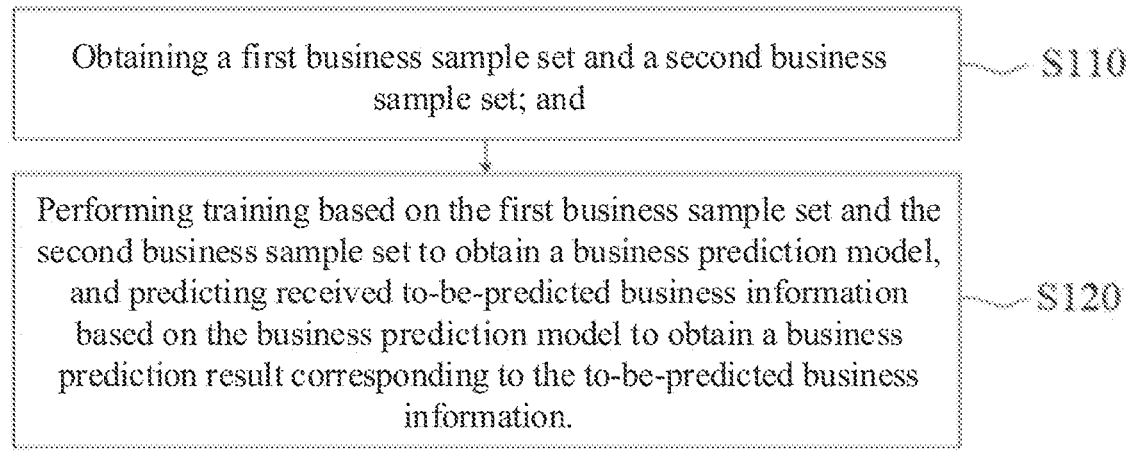
FIG. 1 is a schematic flowchart of a business prediction method according to an embodiment of the present invention.

Refer to FIG. 1. FIG. 1 is a schematic flowchart of a business prediction method according to an embodiment of the present invention. It should be understood that, in another embodiment, sequences of some steps in the business prediction method in this embodiment may be exchanged based on an actual need, or some steps may be omitted or deleted. Detailed steps of the business prediction method are described as follows:

Step S110: Obtain a first business sample set and a second business sample set.

Step S120: Perform training based on the first business sample set and the second business sample set to obtain a business prediction model, and predict received to-be-predicted business information based on the business prediction model to obtain a business prediction result corresponding to the to-be-predicted business information.

In this embodiment, the first business sample set is used to represent a business sample of passing a business validation, and the second business sample set is used to represent a business sample of being rejected in the business validation.

A risk control scenario is used as an example. Risk control has been applied to all parts of the Internet Finance, mainly including personal credit loans and small and micro enterprise credit loans in credit loans, risk control in an investment process, platform capital security, platform technology security, user capital security, user account security, promotion and operation activities, and the like. Generally speaking, risk control is used to determine a repayment ability and repayment willingness, protect against a fraud and a cheat, prevent an external attack on an internal system, avoid capital problems of a platform and a user, and the like. From the perspective of industry, risk control is applied to consumer finance, supply chain finance, credit loans, financial management platforms, P2P, big data credit, third-party payment and other segments of the Internet Finance industry, as well as Internet services such as e-commerce, games and social communication.

For example, in a credit loan approval process, the first business sample set may be used to represent a business sample that has passed loan approval and credit granting and for which a loan is issued, and the second business sample set may be used to represent a business sample that is rejected in loan approval and credit granting and for which no loan is issued.

In this embodiment, the first business sample set may include a training sample set, a test sample set and a validation sample set. For example, the first business sample set may be divided into the training sample set, the test sample set, and the validation sample set in a certain proportion, for example, in a proportion of 7:2:1. The second business sample set may include a rejected sample set.

Based on the above steps, this embodiment takes into account data features of some business samples of being rejected in a business validation, while considering business samples of passing the business validation. This restores a business scenario really, reduces a waste of costs of the rejected samples, and balances demands for a modeling sample and a rejected sample reasonably when there are insufficient samples of passing the business validation. Therefore, the business prediction model obtained through training in this way can predict a future behavior of a rejected business object when predicting the received to-be-predicted business information, thereby reducing a parameter estimation deviation.

In a possible implementation, for step S120, the inventor of the present invention considers that a feature of a business object that has passed validation and a feature of a business object that has not passed validation are different to a certain extent, so the rejected sample cannot be added randomly. Therefore, screening of the rejected sample is particularly important for accuracy of a subsequent prediction effect. Next, some exemplary screening implementations are described, to further ensure stability of the business prediction model, and reflect an actual business scenario more really.

Figure 2:
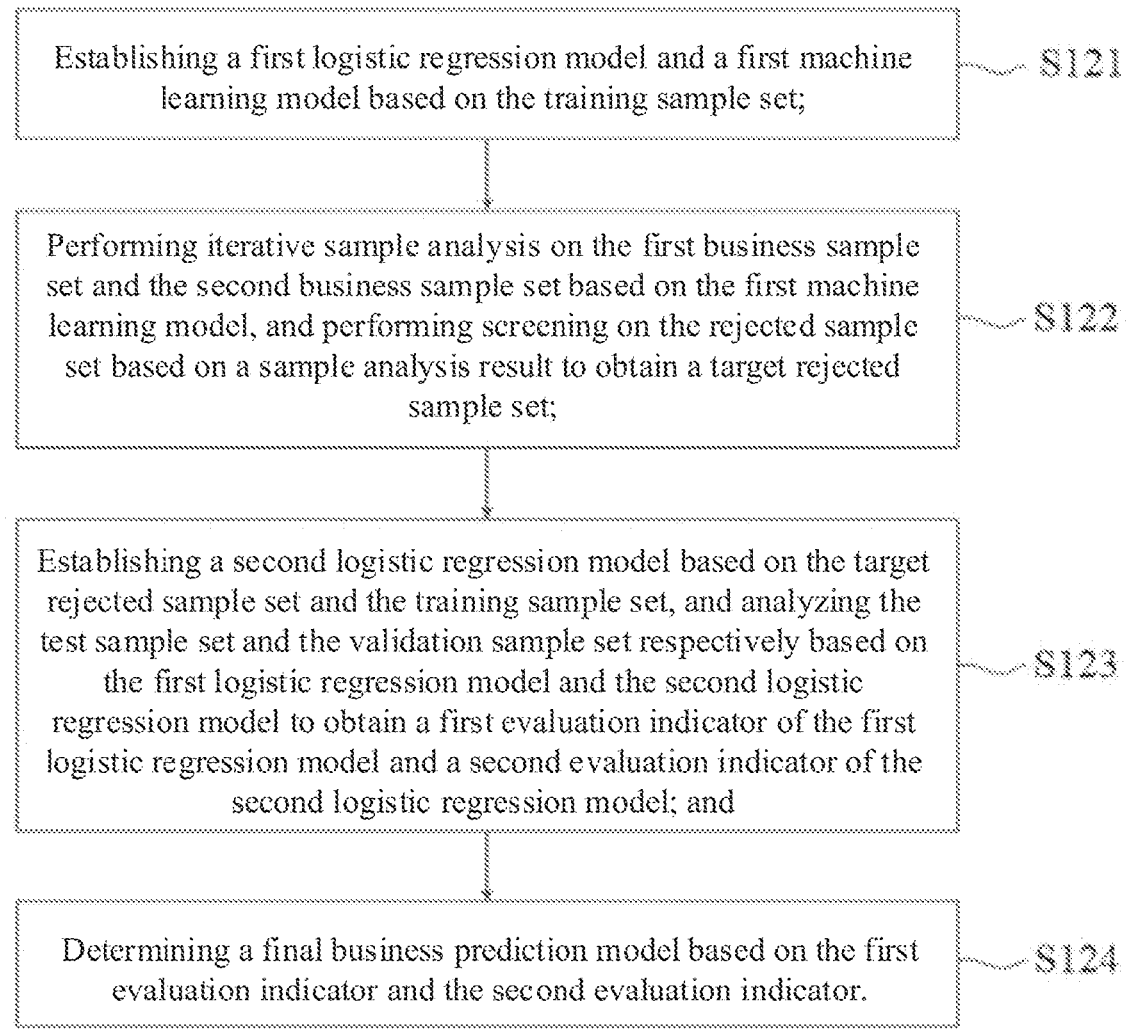
FIG. 2 is a schematic flowchart of substeps of step S120 in FIG. 1.

For example, refer to FIG. 2. Step S120 may be implemented by performing the following exemplary substeps. Details are as follows:

Substep S121: Establish a first logistic regression model and a first machine learning model based on the training sample set.

For example, in a possible implementation, a process of establishing the first logistic regression model may include: inputting the training sample set into an initial logistic regression model, predicting a logistic regression classification label of each training sample in the training sample set, comparing the logistic regression classification label of each training sample and a preset classification label, adjusting a model parameter of the initial logistic regression model based on a comparison result, and repeating training for preset iteration times to obtain the first logistic regression model. Correspondingly, a process of establishing the first machine learning model may include: inputting the training sample set into an initial machine learning model, predicting a classification label of each training sample in the training sample set, comparing the classification label of each training sample and a preset classification label, adjusting a model parameter of the initial machine learning model based on a comparison result, and repeating training for preset iteration times to obtain the first machine learning model. The first machine learning model and the first logistic regression model are different network models, so that classification performance can be evaluated based on different network models.

Substep S122: Perform iterative sample analysis on the first business sample set and the second business sample set based on the first machine learning model, and perform screening on the rejected sample set based on a sample analysis result to obtain a target rejected sample set.

Substep S123: Establish a second logistic regression model based on the target rejected sample set and the training sample set, and analyze the test sample set and the validation sample set respectively based on the first logistic regression model and the second logistic regression model to obtain a first evaluation indicator of the first logistic regression model and a second evaluation indicator of the second logistic regression model.

Substep S124: Determine a final business prediction model based on the first evaluation indicator and the second evaluation indicator.

In this way, after the target rejected sample set is obtained by performing further screening on the rejected sample set, model training is performed based on the training sample set, and the final business prediction model is determined based on the evaluation indicators. This can further improve accuracy of the subsequent prediction effect, ensure the stability of the business prediction model, and reflect the actual business scenario more really.

In a possible implementation, step S122 may be implemented by performing the following exemplary manner. Details are as follows:

(1) Analyze the test sample set based on the first machine learning model, and establish initial AUC and an initial KS value.

In this embodiment, the AUC is defined as area under a receiver operating characteristic curve (ROC). The ROC is drawn based on a series of different binary classification manners (boundary value or decision threshold) by using a true positive rate (TPR) as an ordinate and a false positive rate (FPR) as a horizontal ordinate. In this embodiment, the KS value is max(abs(TPR−FPR)).

TPR=TP/(TP+FN), namely, quantity of positive sample prediction results/actual quantity of positive samples.

FPR=FP/(FP+TN), namely, quantity of negative sample prediction results that are predicted as positive/actual quantity of negative samples.

In this embodiment, the AUC is essentially a probability that a prediction value of a randomly selected positive sample is higher than that of a randomly selected negative sample. The following describes a calculation method with lowest time complexity. It is assumed that there are A positive samples and B negative samples in total. The B+A samples are sorted (in a descending order) based on values predicted by the model. It is assumed that a rank of a sample corresponding to a maximum score is B, a rank of a sample corresponding to a $2^{nd}$ score is B−1, and so on. Then, a quantity of positive sample pairs whose scores are greater than a score of a negative sample in all the samples is obtained by obtaining a sum of ranks of all the positive samples and then subtracting A−1 combinations of two positive samples from the sum. After that, the quantity of positive sample pairs is divided by A×B. Specifically, $$AUC = \Sigma i \in positiveclassranki - A(1+A)/2A*B$$

In this embodiment, a KS curve is closely related to the ROC, and both the KS curve and the ROC use the FPR and the TPR. However, there is a difference between the ROC and the KS curve. Specifically, the ROC uses the FPR as a horizontal axis and the TPR as a vertical axis, and is drawn by using a point depiction method, and there is one line in the figure. The KS curve uses different probability determining thresholds as the horizontal axis, and there are a total of two lines in the figure, representing FPR and TPR values respectively. The KS value is a difference between maximum spacings of the two lines, namely, max (ABS (TPR−FPR)). A horizontal-axis probability threshold corresponding to a maximum spacing is selected as an optimal probability threshold.

(2) Analyze the rejected sample set based on the first machine learning model, and sort rejected samples in the rejected sample set based on a probability score obtained from analyzing to obtain a sorted rejected sample set.

(3) Select, from the sorted rejected sample set, rejected sample sets in different preset rule ranges, and establish a corresponding second machine learning model based on the training sample set and a rejected sample set in each preset rule range.

For example, the first N rejected samples may be selected, from the sorted rejected sample set, as a first rejected sample set, and a corresponding second machine learning model is established based on the training sample set and the first rejected sample set.

The last M rejected samples are selected, from the sorted rejected sample set, as a second rejected sample set, and a corresponding second machine learning model is established based on the training sample set and the second rejected sample set.

The first N rejected samples and the last M rejected samples are used as a third rejected sample set, and a corresponding second machine learning model is established based on the training sample set and the third rejected sample set.

N and M are positive integers.

(4) Perform screening on the rejected sample set based on each corresponding second machine learning model to obtain the target rejected sample set.

For example, the test sample set may be predicted based on each corresponding second machine learning model, and candidate AUC and a candidate KS value of a prediction result of each second machine learning model are generated.

Then, maximum candidate AUC is selected, from all candidate AUC, as target AUC, and a maximum KS value is selected, from all candidate KS values, as a target KS value.

After that, whether a currently configured evaluation indicator is AUC or a KS value is determined.

For example, when the currently configured evaluation indicator is the AUC, whether a sum of the target AUC and a preset tolerance index is greater than the initial AUC is determined.

When the sum of the target AUC and the preset tolerance index tol (tol<=0) is greater than the initial AUC, a rejected sample set in a preset rule range corresponding to the target AUC is used as a screened rejected sample set, and the initial AUC is set to the target AUC; a second machine learning model corresponding to the target AUC is selected as a new first machine learning model; after the screened rejected sample set is deleted from the sorted rejected sample set, the step of analyzing the test sample set based on the first machine learning model and establishing the initial AUC and the initial KS value is performed; when the sum of the target AUC and the preset tolerance index is not greater than the initial AUC, all screened rejected sample sets are determined as the target rejected sample set.

When the sum of the target AUC and the preset tolerance index tol is not greater than the initial AUC, a rejected sample set in a preset rule range corresponding to the target AUC is determined as the target rejected sample set.

For another example, when the currently configured evaluation indicator is the KS value, whether a sum of the target KS value and a preset tolerance index is greater than the initial KS value is determined.

When the sum of the target KS value and the preset tolerance index tol is greater than the initial KS value, a rejected sample set in a preset rule range corresponding to the target KS value is used as a screened rejected sample set, and the initial KS value is set to the target KS value; a second machine learning model corresponding to the target KS value is selected as a new first machine learning model; after the screened rejected sample set is deleted from the sorted rejected sample set, the step of analyzing the test sample set based on the first machine learning model and establishing the initial AUC and the initial KS value is performed; when the sum of the target KS value and the preset tolerance index is not greater than the initial KS value, all screened rejected sample sets are determined as the target rejected sample set.

When the sum of the target KS value and the preset tolerance index tol is not greater than the initial KS value, the rejected sample set in the preset rule range corresponding to the target KS value is determined as the target rejected sample set.

It should be noted that, in the above embodiment, that the currently configured evaluation indicator is one of the AUC and the KS value means that the currently configured evaluation indicator may, for example, include only the AUC, include only the KS value, or may be any one of the AUC and the KS value provided that it meets a condition. This is not specifically limited herein.

In a possible implementation, step S123 may be implemented by performing the following exemplary manner. Details are as follows:

(1) Respectively perform probability prediction on the test sample set and the validation sample set based on the first logistic regression model to obtain a first probability prediction result of the test sample set and the validation sample set, and respectively perform probability prediction on the test sample set and the validation sample set based on the second logistic regression model to obtain a second probability prediction result of the test sample set and the validation sample set.

(2) Respectively calculate first AUC and a first KS value of the first probability prediction result, and second AUC and a second KS value of the second probability prediction result, determine the first AUC and the first KS value as the first evaluation indicator of the first logistic regression model, and determine the second AUC and the second KS value as the second evaluation indicator of the second logistic regression model.

Therefore, in substep S124, a first increase amplitude of the second AUC relative to the first AUC and a second increase amplitude of the second KS value relative to the first KS value can be obtained.

If the first increase amplitude is greater than a predetermined amplitude and/or the second increase amplitude is greater than the predetermined amplitude, the second logistic regression model is determined as the final business prediction model.

If the first increase amplitude is not greater than the predetermined amplitude and the second increase amplitude is not greater than the predetermined amplitude, the first logistic regression model is determined as the final business prediction model.

Figure 3:
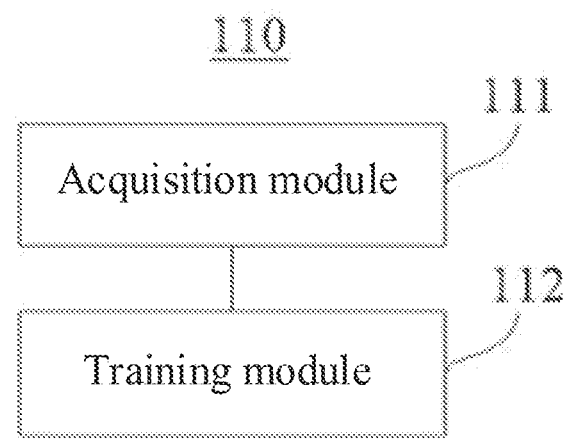
FIG. 3 is a schematic diagram of functional modules of a business prediction apparatus according to an embodiment of the present invention.

Based on a same inventive concept, FIG. 3 is a schematic diagram of functional modules of a business prediction apparatus 110 according to an embodiment of the present invention. In this embodiment, the business prediction apparatus 110 may be divided to functional modules based on the above method embodiment. For example, functional modules may be obtained through division based on corresponding functions, or two or more functions may be integrated into a processing module. The above integrated module may be implemented in a form of hardware, or may be implemented in a form of a functional module of software. It should be noted that the module division in the embodiments of the present invention is an example and is merely logical function division, and may be other division in actual implementation. For example, when the functional modules are obtained through division based on the corresponding functions, FIG. 3 is only a schematic diagram of the business prediction apparatus 110. The business prediction apparatus 110 may include an acquisition module 111 and a training module 112. The following describes in detail functions of the functional modules of the business prediction apparatus 110.

The acquisition module 111 is configured to obtain a first business sample set and a second business sample set, where the first business sample set includes a training sample set, a test sample set and a validation sample set, the second business sample set includes a rejected sample set, the first business sample set is used to represent a business sample of passing a business validation, and the second business sample set is used to represent a business sample of being rejected in the business validation. It can be understood that the acquisition module 111 may be configured to perform the above step S110. For a detailed implementation of the acquisition module 111, refer to related content of the above step S110.

The training module 112 is configured to perform training based on the first business sample set and the second business sample set to obtain a business prediction model, and predict received to-be-predicted business information based on the business prediction model to obtain a business prediction result corresponding to the to-be-predicted business information. It can be understood that the training module 112 may be configured to perform the above step S120. For a detailed implementation of the training module 112, refer to related content of the above step S120.

In a possible implementation, the training module 112 is specifically configured to:

establish a first logistic regression model and a first machine learning model based on the training sample set;

perform iterative sample analysis on the first business sample set and the second business sample set based on the first machine learning model, and perform screening on the rejected sample set based on a sample analysis result to obtain a target rejected sample set;

establish a second logistic regression model based on the target rejected sample set and the training sample set, and analyze the test sample set and the validation sample set respectively based on the first logistic regression model and the second logistic regression model to obtain a first evaluation indicator of the first logistic regression model and a second evaluation indicator of the second logistic regression model; and determine a final business prediction model based on the first evaluation indicator and the second evaluation indicator.

In a possible implementation, the training module 112 is specifically configured to:

analyze the test sample set based on the first machine learning model, and establish initial AUC and an initial KS value;

analyze the rejected sample set based on the first machine learning model, and sort rejected samples in the rejected sample set based on a probability score obtained from analyzing to obtain a sorted rejected sample set;

select, from the sorted rejected sample set, rejected sample sets in different preset rule ranges, and establish a corresponding second machine learning model based on the training sample set and a rejected sample set in each preset rule range; and perform screening on the rejected sample set based on each corresponding second machine learning model to obtain the target rejected sample set.

In a possible implementation, the training module 112 is specifically configured to:

select, from the sorted rejected sample set, the first N rejected samples as a first rejected sample set, and establish a corresponding second machine learning model based on the training sample set and the first rejected sample set;

select, from the sorted rejected sample set, the last M rejected samples as a second rejected sample set, and establish a corresponding second machine learning model based on the training sample set and the second rejected sample set; and use the first N rejected samples and the last M rejected samples as a third rejected sample set, and establish a corresponding second machine learning model on the training sample set and the third rejected sample set.

In a possible implementation, the training module 112 is specifically configured to:

predict the test sample set based on each corresponding second machine learning model, and generate candidate AUC and a candidate KS value of a prediction result of each second machine learning model;

select, from all candidate AUC, maximum candidate AUC as target AUC, and select, from all candidate KS values, a maximum KS value as a target KS value;

determine whether a currently configured evaluation indicator is AUC or a KS value, and when the currently configured evaluation indicator is the AUC, determine whether a sum of the target AUC and a preset tolerance index is greater than the initial AUC;

when the sum of the target AUC and the preset tolerance index is greater than the initial AUC, use a rejected sample set in a preset rule range corresponding to the target AUC to be a screened rejected sample set, and set the initial AUC to the target AUC; select a second machine learning model corresponding to the target AUC to be a new first machine learning model; after deleting the screened rejected sample set from the sorted rejected sample set, perform the step of analyzing the test sample set based on the first machine learning model and establishing the initial AUC and the initial KS value; when the sum of the target AUC and the preset tolerance index is not greater than the initial AUC, determine all screened rejected sample sets as the target rejected sample set; and when the sum of the target AUC and the preset tolerance index is not greater than the initial AUC, determine a rejected sample set in a preset rule range corresponding to the target AUC to be the target rejected sample set; or when the currently configured evaluation indicator is the KS value, determine whether a sum of the target KS value and a preset tolerance index is greater than the initial KS value;

when the sum of the target KS value and the preset tolerance index is greater than the initial KS value, use a rejected sample set in a preset rule range corresponding to the target KS value to be a screened rejected sample set, and set the initial KS value to the target KS value; select a second machine learning model corresponding to the target KS value to be a new first machine learning model; after deleting the screened rejected sample set from the sorted rejected sample set, perform the step of analyzing the test sample set based on the first machine learning model and establishing the initial AUC and the initial KS value; when the sum of the target KS value and the preset tolerance index is not greater than the initial KS value, determine all screened rejected sample sets as the target rejected sample set; and when the sum of the target KS value and the preset tolerance index is not greater than the initial KS value, determine the rejected sample set in the preset rule range corresponding to the target KS value as the target rejected sample set.

In a possible implementation, the training module 112 is specifically configured to:

respectively perform probability prediction on the test sample set and the validation sample set based on the first logistic regression model to obtain a first probability prediction result of the test sample set and the validation sample set, and respectively perform probability prediction on the test sample set and the validation sample set based on the second logistic regression model to obtain a second probability prediction result of the test sample set and the validation sample set; and respectively calculate first AUC and a first KS value of the first probability prediction result, and second AUC and a second KS value of the second probability prediction result, determine the first AUC and the first KS value as the first evaluation indicator of the first logistic regression model, and determine the second AUC and the second KS value as the second evaluation indicator of the second logistic regression model.

In a possible implementation, the training module 112 is specifically configured to:

obtain a first increase amplitude of the second AUC relative to the first AUC, and a second increase amplitude of the second KS value relative to the first KS value;

if the first increase amplitude is greater than a predetermined amplitude and/or the second increase amplitude is greater than the predetermined amplitude, determine the second logistic regression model as the final business prediction model; and if the first increase amplitude is not greater than the predetermined amplitude and the second increase amplitude is not greater than the predetermined amplitude, determine the first logistic regression model as the final business prediction model.

Figure 4:
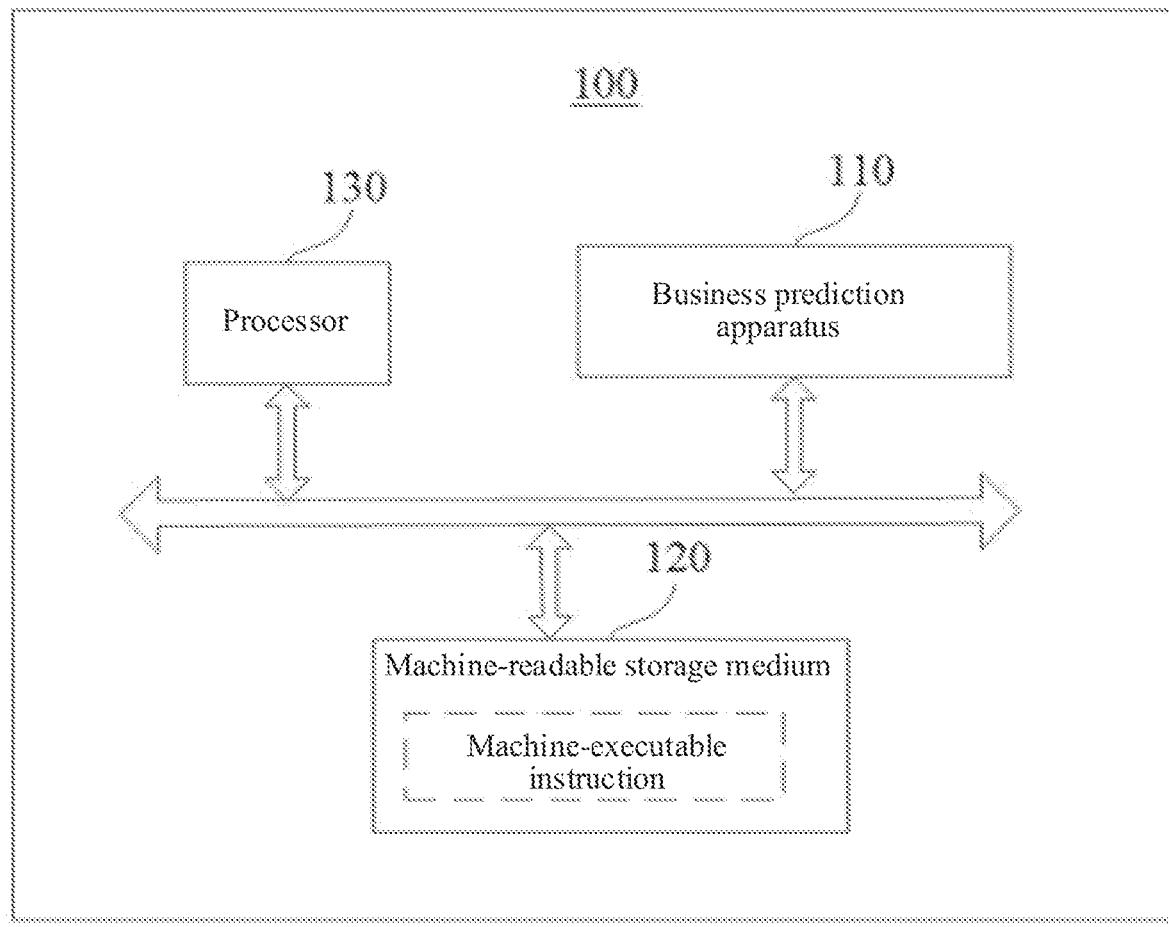
FIG. 4 is a schematic structural diagram of components of a computer device configured to perform the above business prediction method according to an embodiment of the present invention.

Based on a same inventive concept, FIG. 4 is a schematic structural block diagram of a computer device 100 configured to perform the above business prediction method according to an embodiment of the present invention. The computer device 100 may include a business prediction apparatus 110, a machine-readable storage medium 120, and a processor 130.

In this embodiment, the machine-readable storage medium 120 and the processor 130 are both located in the computer device 100, and are separated from each other. However, it should be understood that the machine-readable storage medium 120 may alternatively be independent of the computer device 100 and may be accessed by the processor 130 by using a bus interface. Alternatively, the machine-readable storage medium 120 may be integrated into the processor 130, for example, may be a high-speed cache and/or a general register.

The business prediction apparatus 110 may include functional modules (such as the acquisition module 111 and training module 112 shown in FIG. 3) of software that are stored in the machine-readable storage medium 120. The processor 130 executes the functional modules of the software in the business prediction apparatus 110 to implement the business prediction method provided in the above method embodiment.

The computer device 100 provided in this embodiment of the present invention is another implementation of the method embodiment executed by the computer device 100, and the computer device 100 can be configured to execute the business prediction method provided in the above method embodiment. Therefore, for a technical effect achieved by the computer device 100, refer to the above method embodiment, and details are not described herein again.

Apparently, the described embodiments are some rather than all of the embodiments of the present invention. Generally, the components of the embodiments of the present invention and shown in the accompanying drawings may be provided and designed in various manners. Therefore, the detailed description of the embodiments of the present invention with reference to the accompanying drawings is not intended to limit the protection scope of the present invention, but merely to represent the selected embodiments of the present invention. Therefore, the protection scope of the present invention shall be subject to the protection scope of the claims. All other embodiments obtained by those of ordinary skill in the art based on the embodiments of the present invention without creative efforts should fall within the protection scope of the present invention.

What is claimed is:

1. A business prediction method, applied to a computer device, comprising:

obtaining a first business sample set and a second business sample set, wherein the first business sample set comprises a training sample set, a test sample set and a validation sample set, the second business sample set comprises a rejected sample set, the first business sample set is used to represent a business sample of passing a business validation, and the second business sample set is used to represent a business sample of being rejected in the business validation; and performing training based on the first business sample set and the second business sample set to obtain a business prediction model, and predicting received to-be-predicted business information based on the business prediction model to obtain a business prediction result corresponding to the received to-be-predicted business information;

wherein the step of performing training based on the first business sample set and the second business sample set to obtain the business prediction model comprises:

establishing a first logistic regression model and a first machine learning model based on the training sample set;

performing iterative sample analysis on the first business sample set and the second business sample set based on the first machine learning model, and performing screening on the rejected sample set based on a sample analysis result to obtain a target rejected sample set;

establishing a second logistic regression model based on the target rejected sample set and the training sample set, and analyzing the test sample set and the validation sample set respectively based on the first logistic regression model and the second logistic regression model to obtain a first evaluation indicator of the first logistic regression model and a second evaluation indicator of the second logistic regression model; and determining a final business prediction model based on the first evaluation indicator and the second evaluation indicator;

wherein the step of performing iterative sample analysis on the first business sample set and the second business sample set based on the first machine learning model, and performing screening on the rejected sample set based on the sample analysis result to obtain the target rejected sample set comprises:

analyzing the test sample set based on the first machine learning model, and establishing initial area under curve (AUC) and an initial Kolmogorov-Smirnov (KS) value;

analyzing the rejected sample set based on the first machine learning model, and sorting rejected samples in the rejected sample set based on a probability score obtained from analyzing to obtain a sorted rejected sample set;

selecting, from the sorted rejected sample set, rejected sample sets in different preset rule ranges, and establishing a corresponding second machine learning model based on the training sample set and a rejected sample set in each preset rule range; and performing screening on the rejected sample set based on each corresponding second machine learning model to obtain the target rejected sample set;

wherein the step of performing screening on the rejected sample set based on the each corresponding second machine learning model to obtain the target rejected sample set comprises:

predicting the test sample set based on the each corresponding second machine learning model, and generating candidate AUC and a candidate KS value of a prediction result of the each second machine learning model;

selecting, from all candidate AUC, maximum candidate AUC as target AUC, and selecting, from all candidate KS values, a maximum KS value as a target KS value;

determining whether a currently configured evaluation indicator is AUC or a KS value, and when the currently configured evaluation indicator is the AUC, determining whether a sum of the target AUC and a preset tolerance index is greater than the initial AUC;

when the sum of the target AUC and the preset tolerance index is greater than the initial AUC, using a rejected sample set in a preset rule range corresponding to the target AUC to be a screened rejected sample set, and setting the initial AUC to the target AUC; selecting a second machine learning model corresponding to the target AUC to be a new first machine learning model; after deleting the screened rejected sample set from the sorted rejected sample set, performing the step of analyzing the test sample set based on the first machine learning model and establishing the initial AUC and the initial KS value; when the sum of the target AUC and the preset tolerance index is not greater than the initial AUC, determining all screened rejected sample sets as the target rejected sample set; and when the sum of the target AUC and the preset tolerance index is not greater than the initial AUC, determining the rejected sample set in the preset rule range corresponding to the target AUC to be the target rejected sample set; or when the currently configured evaluation indicator is the KS value, determining whether a sum of the target KS value and a preset tolerance index is greater than the initial KS value;

when the sum of the target KS value and the preset tolerance index is greater than the initial KS value, using a rejected sample set in a preset rule range corresponding to the target KS value to be a screened rejected sample set, and setting the initial KS value to the target KS value; selecting a second machine learning model corresponding to the target KS value to be a new first machine learning model; after deleting the screened rejected sample set from the sorted rejected sample set, performing the step of analyzing the test sample set based on the first machine learning model and establishing the initial AUC and the initial KS value; when the sum of the target KS value and the preset tolerance index is not greater than the initial KS value, determining all screened rejected sample sets as the target rejected sample set; and when the sum of the target KS value and the preset tolerance index is not greater than the initial KS value, determining the rejected sample set in the preset rule range corresponding to the target KS value to be the target rejected sample set;

wherein the step of analyzing the test sample set and the validation sample set respectively based on the first logistic regression model and the second logistic regression model to obtain the first evaluation indicator of the first logistic regression model and the second evaluation indicator of the second logistic regression model comprises:

respectively performing probability prediction on the test sample set and the validation sample set based on the first logistic regression model to obtain a first probability prediction result of the test sample set and the validation sample set, and respectively performing probability prediction on the test sample set and the validation sample set based on the second logistic regression model to obtain a second probability prediction result of the test sample set and the validation sample set; and respectively calculating first AUC and a first KS value of the first probability prediction result, and second AUC and a second KS value of the second probability prediction result, determining the first AUC and the first KS value as the first evaluation indicator of the first logistic regression model, and determining the second AUC and the second KS value as the second evaluation indicator of the second logistic regression model;

wherein the step of determining the final business prediction model based on the first evaluation indicator and the second evaluation indicator comprises:

obtaining a first increase amplitude of the second AUC relative to the first AUC, and a second increase amplitude of the second KS value relative to the first KS value;

when the first increase amplitude is greater than a predetermined amplitude and/or the second increase amplitude is greater than the predetermined amplitude, determining the second logistic regression model as the final business prediction model; and when the first increase amplitude is not greater than the predetermined amplitude and the second increase amplitude is not greater than the predetermined amplitude, determining the first logistic regression model as the final business prediction model.

2. The business prediction method according to claim 1, wherein the step of selecting, from the sorted rejected sample set, the rejected sample sets in the different preset rule ranges, and establishing the corresponding second machine learning model based on the training sample set and the rejected sample set in the each preset rule range comprises:

selecting, from the sorted rejected sample set, first N rejected samples as a first rejected sample set, and establishing a corresponding second machine learning model based on the training sample set and the first rejected sample set;

selecting, from the sorted rejected sample set, last M rejected samples as a second rejected sample set, and establishing a corresponding second machine learning model based on the training sample set and the second rejected sample set; and using the first N rejected samples and the last M rejected samples as a third rejected sample set, and establishing a corresponding second machine learning model based on the training sample set and the third rejected sample set.

3. A business prediction apparatus, applied to a computer device, comprising:

an acquisition module, configured to obtain a first business sample set and a second business sample set, wherein the first business sample set comprises a training sample set, a test sample set and a validation sample set, the second business sample set comprises a rejected sample set, the first business sample set is used to represent a business sample of passing a business validation, and the second business sample set is used to represent a business sample of being rejected in the business validation; and a training module, configured to perform training based on the first business sample set and the second business sample set to obtain a business prediction model, and predict received to-be-predicted business information based on the business prediction model to obtain a business prediction result corresponding to the received to-be-predicted business information;

wherein the training module is specifically configured to:

establish a first logistic regression model and a first machine learning model based on the training sample set;

perform iterative sample analysis on the first business sample set and the second business sample set based on the first machine learning model, and perform screening on the rejected sample set based on a sample analysis result to obtain a target rejected sample set;

establish a second logistic regression model based on the target rejected sample set and the training sample set, and analyze the test sample set and the validation sample set respectively based on the first logistic regression model and the second logistic regression model to obtain a first evaluation indicator of the first logistic regression model and a second evaluation indicator of the second logistic regression model; and determine a final business prediction model based on the first evaluation indicator and the second evaluation indicator;

wherein the training module is specifically configured to:

analyze the test sample set based on the first machine learning model, and establish initial area under curve (AUC) and an initial Kolmogorov-Smirnov (KS) value;

analyze the rejected sample set based on the first machine learning model, and sort rejected samples in the rejected sample set based on a probability score obtained from analyzing to obtain a sorted rejected sample set;

select, from the sorted rejected sample set, rejected sample sets in different preset rule ranges, and establish a corresponding second machine learning model based on the training sample set and a rejected sample set in each preset rule range; and perform screening on the rejected sample set based on each corresponding second machine learning model to obtain the target rejected sample set;

wherein the training module is specifically configured to:

predict the test sample set based on the each corresponding second machine learning model, and generate candidate AUC and a candidate KS value of a prediction result of the each second machine learning model;

select, from all candidate AUC, maximum candidate AUC as target AUC, and select, from all candidate KS values, a maximum KS value as a target KS value;

determine whether a currently configured evaluation indicator is AUC or a KS value, and when the currently configured evaluation indicator is the AUC, determine whether a sum of the target AUC and a preset tolerance index is greater than the initial AUC;

when the sum of the target AUC and the preset tolerance index is greater than the initial AUC, use a rejected sample set in a preset rule range corresponding to the target AUC to be a screened rejected sample set, and set the initial AUC to the target AUC; select a second machine learning model corresponding to the target AUC to be a new first machine learning model; after deleting the screened rejected sample set from the sorted rejected sample set, perform an operation of analyzing the test sample set based on the first machine learning model and establishing the initial AUC and the initial KS value; when the sum of the target KS value and the preset tolerance index is not greater than the initial AUC, determine all screened rejected sample sets as the target rejected sample set; and when the sum of the target AUC and the preset tolerance index is not greater than the initial AUC, determine the rejected sample set in the preset rule range corresponding to the target AUC to be the target rejected sample set; or when the currently configured evaluation indicator is the KS value, determine whether a sum of the target KS value and a preset tolerance index is greater than the initial KS value;

when the sum of the target KS value and the preset tolerance index is greater than the initial KS value, use a rejected sample set in a preset rule range corresponding to the target KS value to be a screened rejected sample set, and set the initial KS value to the target KS value; select a second machine learning model corresponding to the target KS value to be a new first machine learning model; after deleting the screened rejected sample set from the sorted rejected sample set, perform a manner of analyzing the test sample set based on the first machine learning model and establishing the initial AUC and the initial KS value; when the sum of the target KS value and the preset tolerance index is not greater than the initial KS value, determine all screened rejected sample sets as the target rejected sample set; and when the sum of the target KS value and the preset tolerance index is not greater than the initial KS value, determine the rejected sample set in the preset rule range corresponding to the target KS value to be the target rejected sample set;

wherein the training module is specifically configured to:

respectively perform probability prediction on the test sample set and the validation sample set based on the first logistic regression model to obtain a first probability prediction result of the test sample set and the validation sample set, and respectively perform probability prediction on the test sample set and the validation sample set based on the second logistic regression model to obtain a second probability prediction result of the test sample set and the validation sample set; and respectively calculate first AUC and a first KS value of the first probability prediction result, and second AUC and a second KS value of the second probability prediction result, determine the first AUC and the first KS value as the first evaluation indicator of the first logistic regression model, and determine the second AUC and the second KS value as the second evaluation indicator of the second logistic regression model;

wherein the training module is specifically configured to:

obtain a first increase amplitude of the second AUC relative to the first AUC, and a second increase amplitude of the second KS value relative to the first KS value;

when the first increase amplitude is greater than a predetermined amplitude and/or the second increase amplitude is greater than the predetermined amplitude, determine the second logistic regression model as the final business prediction model; and when the first increase amplitude is not greater than the predetermined amplitude and the second increase amplitude is not greater than the predetermined amplitude, determine the first logistic regression model as the final business prediction model.

* * * * *